US007696902B2

(12) United States Patent
Ichikawa et al.

(10) Patent No.: US 7,696,902 B2
(45) Date of Patent: Apr. 13, 2010

(54) TIRE SENSOR DEVICE AND TIRE INFORMATION TRANSMISSION METHOD

(75) Inventors: Hiromitsu Ichikawa, Tokyo (JP); Hiromasa Hada, Tokyo (JP); Takao Kokubu, Tokyo (JP); Masaharu Oku, Tokyo (JP); Masanobu Toyofuku, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 763 days.

(21) Appl. No.: 10/577,730

(22) PCT Filed: Nov. 8, 2004

(86) PCT No.: PCT/JP2004/016528

§ 371 (c)(1),
(2), (4) Date: May 2, 2006

(87) PCT Pub. No.: WO2005/045781

PCT Pub. Date: May 19, 2005

(65) Prior Publication Data
US 2007/0080795 A1 Apr. 12, 2007

(30) Foreign Application Priority Data
Nov. 7, 2003 (JP) ............................. 2003-378416
Sep. 6, 2004 (JP) ............................. 2004-258300

(51) Int. Cl.
*B60C 23/00* (2006.01)
(52) U.S. Cl. ............. 340/870.07; 340/447; 340/870.06; 340/426.33; 340/572.1; 340/442; 73/45.6
(58) Field of Classification Search ................. 340/447, 340/870.07, 870.05, 870.06, 426.33, 442, 340/572.1; 73/45.6
See application file for complete search history.

(56) References Cited

U.S. PATENT DOCUMENTS

| 6,217,683 | B1* | 4/2001 | Balzer et al. ................... 156/60 |
| 6,724,301 | B2* | 4/2004 | Ginman et al. ............... 340/447 |
| 6,902,136 | B2* | 6/2005 | Mackness ................ 244/100 R |
| 7,050,017 | B2* | 5/2006 | King et al. ................... 343/873 |
| 7,116,213 | B2* | 10/2006 | Thiesen et al. ............... 340/10.1 |
| 7,361,998 | B2* | 4/2008 | Hamel et al. ................ 290/1 R |
| 2002/0019712 | A1 | 2/2002 | Petite et al. |

FOREIGN PATENT DOCUMENTS

| JP | 2000-261360 A | 9/2000 |
| JP | 2002-211219 A | 7/2002 |

(Continued)

OTHER PUBLICATIONS

A Power Generation Circuit for Contactless IC Cards, Ji Ying, et al, Microelectronics, vol. 30; pp. 127-129 and 140; Apr. 2000.

*Primary Examiner*—Albert K Wong
(74) *Attorney, Agent, or Firm*—Sughure Mion, PLLC (57) ABSTRACT

A tire sensor device comprising sensor modules 20A to 20D, each comprising a sensor, a communication module having a communication function and a power regenerating circuit, and an antenna; and a base station comprising an internal communication device for communication with the sensor modules 20A to 20D, an information processing device for processing tire information signals from the sensor modules, an external communication device for communicating with a car control device 40 on the car body side and a power source. The sensor modules 20A to 20D and the base station 30 are arranged in the tire and constitute an intra-tire LAN. Tire information signals transmitted from the sensor modules 20A to 20D are processed by the base station 30 and transmitted to the car control device 40 so that appropriate tire information can be obtained and the size and power consumption of the sensor device can be reduced.

12 Claims, 9 Drawing Sheets

FOREIGN PATENT DOCUMENTS

| | | |
|---|---|---|
| JP | 2002-216281 A | 8/2002 |
| JP | 2002-541003 A | 12/2002 |
| JP | 2003-002019 A | 1/2003 |
| JP | 2003-151064 A | 5/2003 |
| JP | 2003-288659 A | 10/2003 |
| WO | WO 01/89896 A1 | 11/2001 |

* cited by examiner

TIRE SENSOR DEVICE AND TIRE INFORMATION TRANSMISSION METHOD

BACKGROUND OF THE INVENTION

1. Field of the Invention

The present invention relates to a tire sensor device which collects and processes information from sensors mounted in a tire and transmits the processed information to the car body side and to a tire information transmission method.

2. Description of the Prior Art

Figures 8A, 8B:
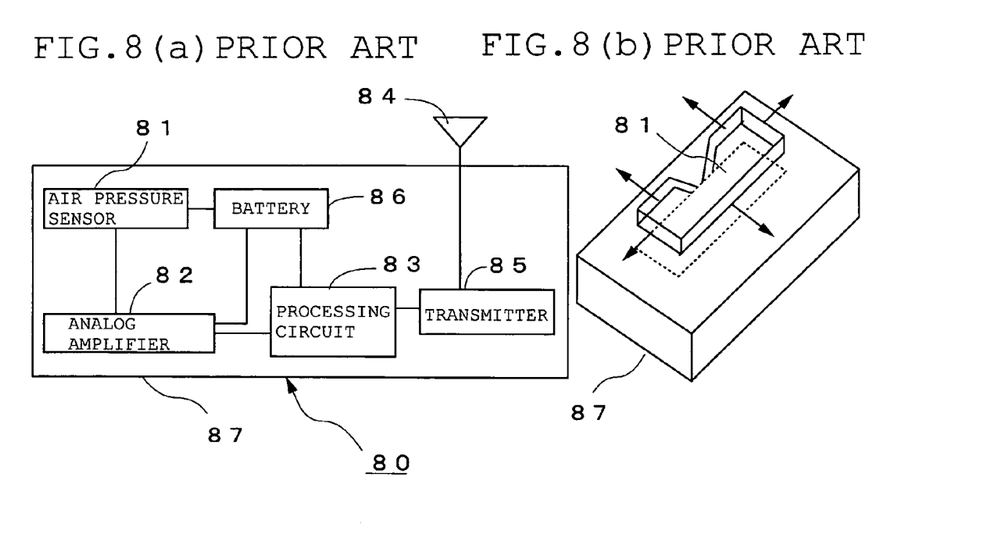
FIGS. 8(a) and 8(b) are diagrams showing the constitution of a tire pressure sensor tag of the prior art.

Heretofore, there has been implemented a tire air pressure monitoring device which detects the inside pressure of a tire by mounting a pressure sensor device for detecting the pressure of a gas filled in the tire on a surface facing a tire cavity area of a wheel and transmits the detected information to the car body side so as to inform a driver of the inside pressure of the tire. FIG. 8(a) is a block diagram showing the constitution of a tire pressure sensor tag 80 which is the pressure sensor device of the prior art. This tire pressure sensor tag 80 comprises an air pressure sensor 81 for detecting the inside pressure of the tire, an analog amplifier 82 for amplifying a tire inside pressure signal detected by the air pressure sensor 81, a processing circuit 83 for processing a pressure signal indicative of the inside pressure of the tire based on a signal from the above analog amplifier 82, a transmitter 85 for modifying a carrier based on a pressure signal detected by the above air pressure sensor 81 and processed by the processing circuit 83 and transmitting the modified carrier to the unshown car body side from an antenna 84, and a battery 86 for supplying power for driving these devices. The above air pressure sensor 81 is composed of a diaphragm made of an elastic material such as silicon rubber, mounted on a substrate 87 as shown in FIG. 8(b), and the above analog amplifier 82, processing circuit 83, transmitter 83 and antenna 84 are also formed on the above substrate 87. The battery 86 such as a button type battery is mounted on the substrate 87 separately from the above constituent elements (refer to patent document 1, for example).

However, as the above battery drive type tire pressure sensor tag 80 comprises the transmitter 85 for transmitting the above tire pressure information to the car body side in addition to the analog amplifier 82 and the processing circuit 83, the service life of the battery is short and therefore the above tire pressure sensor tag 80 must be exchanged regularly.

Figure 9:
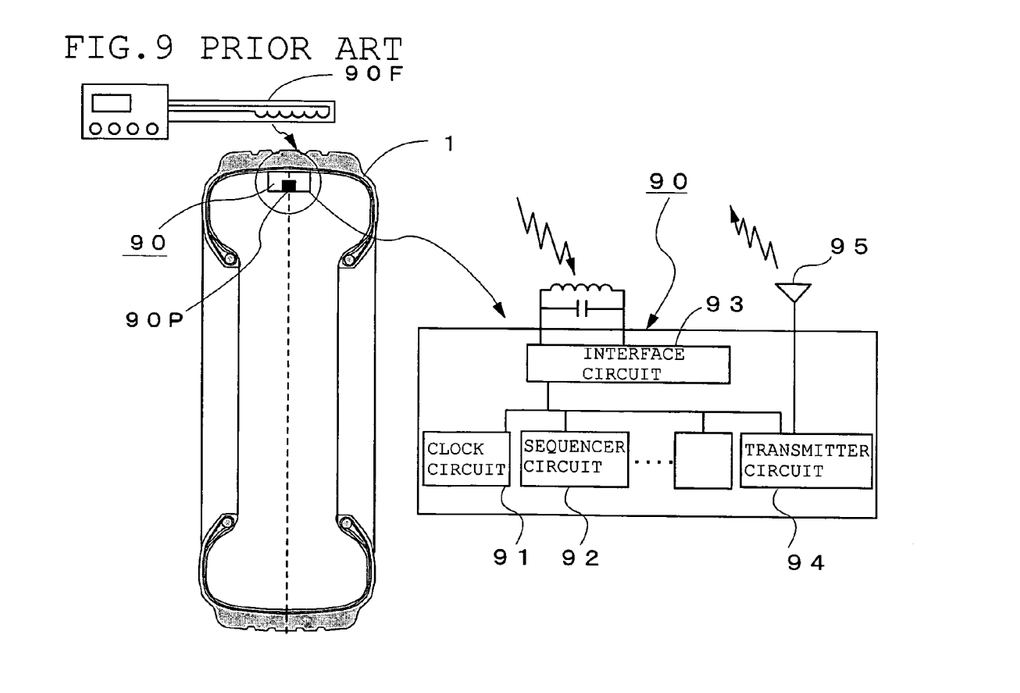
FIG. 9 is a diagram of a tire sensor device comprising an RF transponder of the prior art.

Meanwhile, as shown in FIG. 9, there is known a tire sensor device 90 which comprises an RF transponder for responding to a carrier signal (query signal) from a call unit 90F in the tire 1 to collect data on the inside pressure of the tire. Since this tire sensor device 90 comprises an interface circuit 93 for rectifying a received RF signal and supplying power to other circuits such as a clock circuit 91 as a signal processing circuit, a sequencer circuit 92 and an unshown drive circuit and uses the above RF signal which is a query signal as an electric energy source for transmitting a digital signal regarding tire pressure data measured by an on-chip pressure sensor 90P, it does not require a battery and can detect the inside pressure of the tire stably for a long time. In the above tire sensor device 90, an on-board oscillator (not shown) installed in a transmission circuit 94 operates to transmit data on the inside pressure of the tire measured by the on-chip pressure sensor 90P to the car body side from an antenna 95 only when it receives the query signal (refer to patent document 2, for example).

Meanwhile, to enhance the running stability of an automobile, it is desired that the conditions of the running tire should be estimated accurately and fed back to car control. It is considered that this information makes possible the advanced control of an ABS brake and a car attitude control device making use of the ABS brake to further enhance safety.

Figure 10A:
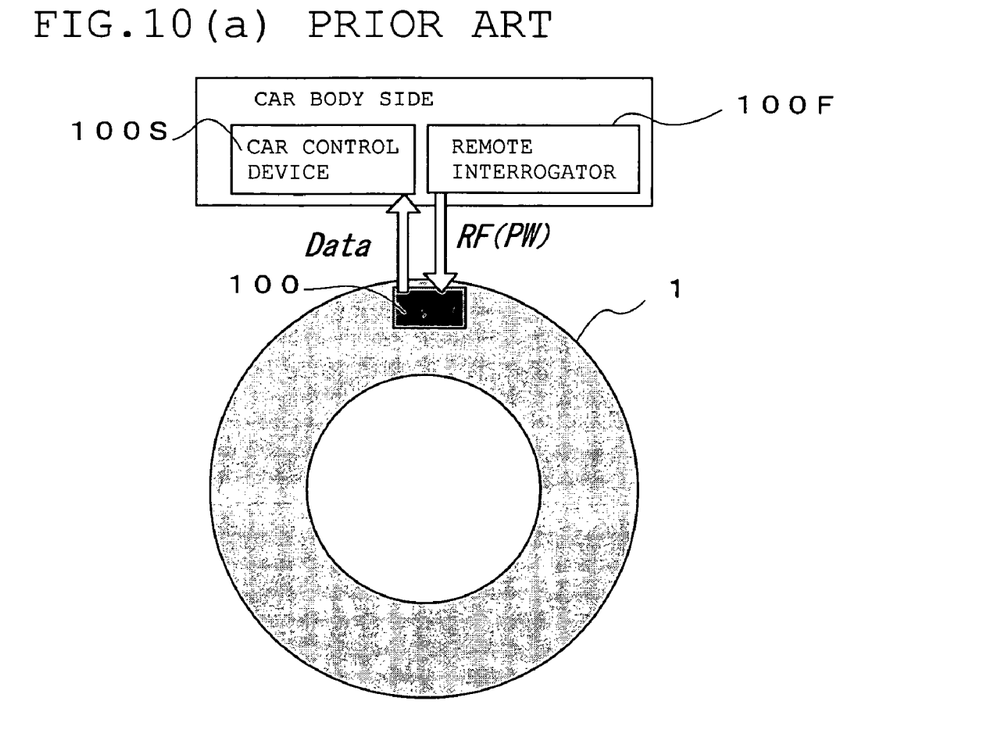
FIGS. 10(a) and 10(b) are diagrams showing the constitution of a tire sensor device comprising a plurality of sensors of the prior art.
Figure 10B:
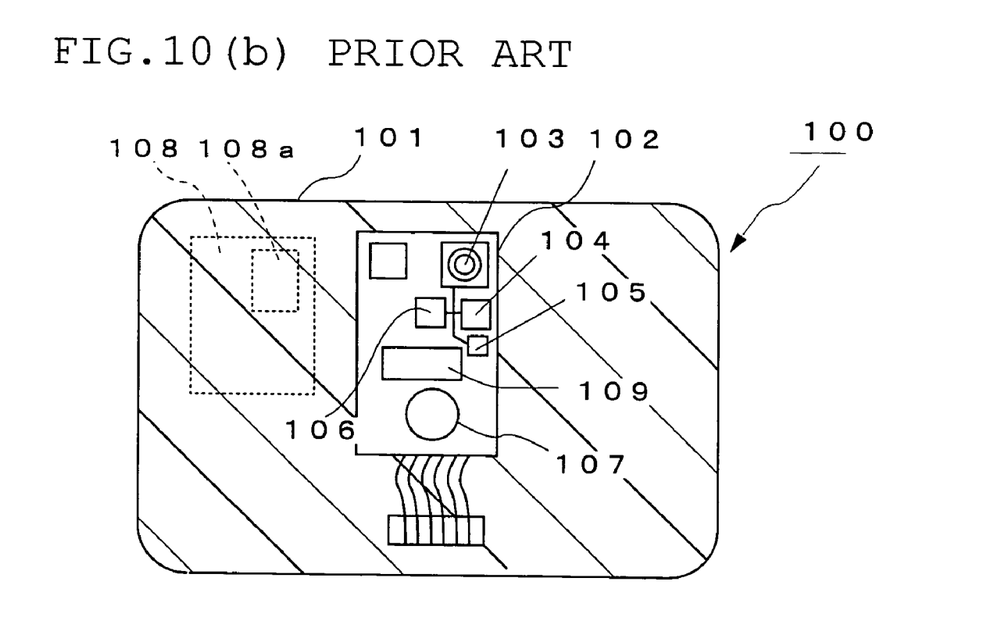

As shown in FIGS. 10(a) and 10(b), there is proposed a tire sensor device 100 which comprises sensors such as a pressure sensor 103, a temperature sensor 104 and a revolution sensor 105 all of which are installed in the tire and mounted on the substrate 102 of a housing 101, a driver 106 for driving these sensors and an on-board power source 107 to collect a plurality of tire data and transmit them to the car body side. When this tire sensor device 100 receives a query signal from a remote interrogator 100F installed on the car body side, it activates the sensors 103 to 105 to detect tire data such as tire pressure and tire temperature, digitizes the detected tire data, transmits these data to the central processing device 108a of a transponder 108 installed in the housing 101 to process them, and transmits the processed data to a car control device 100S on the car body side from an antenna 109. Thereby, various tire data can be obtained with the single tire sensor device 100 (refer to patent document 3, for example).

Patent document 1: JP-A 2003-347811
Patent document 2: JP-B 2002-511355
Patent document 3: JP-B 11-504585

SUMMARY OF THE INVENTION

However, in the above tire sensor device 100, the sensors are installed at one location. Therefore, a plurality of sensors cannot be installed at desired locations of a tire, for example, a plurality of sensors are spaced apart from one another in the transverse direction of the tire in order to obtain information on the ground contact condition of the tire caused by lateral force. Thus, tire information which can be collected is limited.

Then, it is conceivable that sensors be installed not at one location but at various locations where tire information can be easily obtained. When the above sensors are driven by a battery, a large-sized transmitter is required to transmit tire information signals to the car body side, thereby shortening the service life of the battery. Even when the above sensor device is composed of the above RF transponder, a transmitter having large transmission power for transmitting the above tire information signals to the car body side must be installed in the sensor device, whereby the device becomes bulky and power efficiency becomes low.

It is an object of the present invention which has been made in view of the above problems of the prior art to provide a practical tire information transmission method capable of obtaining suitable tire information and reducing the size and consumption power of each sensor device and a tire sensor device used in the method.

The inventors of the present invention have conducted intensive studies and have found that when sensors are installed not at one location but at predetermined locations where tire information can be easily obtained, tire information obtained by the sensors is not directly transmitted to the car body side but collected at a base station for communicating with the car body side and then transmitted to the car body side from the base station, and power for driving the sensor devices is supplied from the above base station or the car body side, suitable tire information can be obtained, a transmitter having large transmission power may be installed only in the base station, the sensor devices do not require a power source, and the sensor sections can be made small in size, thereby making it possible to collect tire information efficiently without influencing the running tire. The present invention has been accomplished based on this finding.

That is, according to a first aspect of the present invention, there is provided a method of transmitting tire information detected by a plurality of sensors installed on a tire to the car body side, comprising the steps of:

mounting sensor devices, each comprising a sensor for detecting the tire information, at a plurality of locations of the tire;

mounting in the tire a base station for communicating with the car body side which is connected to the sensor devices to collect the tire information detected by the sensors; and transmitting the collected tire information from the base station to the car body side.

The sensor devices and the base station are connected to each other by electric wires, radio waves, light (visible light, ultraviolet light, infrared light) or optical cables.

According to a second aspect of the present invention, there is provided a tire information transmission method, wherein the sensor devices are each provided with a communication device capable of communicating only with the base station to construct an intra-tire network with the communication devices of the sensor devices and the base station.

According to a third aspect of the present invention, there is provided a tire information transmission method, wherein a protocol different from a protocol used for communication between the base station and the car body side is used for communication between the base station and the communication devices.

According to a fourth aspect of the present invention, there is provided a tire information transmission method, wherein the sensor devices are driven by a radio wave transmitted from the car body side.

According to a fifth aspect of the present invention, there is provided a device for transmitting tire information detected by sensors installed in a tire to a vehicle side, comprising:

a plurality of sensor devices, each comprising a sensor for detecting the condition of the tire, installed at predetermined locations of the tire; and a base station, connected to the sensor devices, for processing signals indicative of the conditions of the tire detected by the sensors and transmitting the processed signals to the car body side.

According to a sixth aspect of the present invention, there is provided a tire sensor device, wherein the sensor devices are each provided with a communication device capable of communicating only with the base station.

According to a seventh aspect of the present invention, there is provided a tire sensor device, wherein the communication device of each sensor is provided with means of receiving a radio wave transmitted from the base station to generate power voltage for driving the sensor.

According to an eighth aspect of the present invention, there is provided a tire sensor device, wherein the base station is provided with the function of controlling the sensors synchronously to measure a plurality of tire information data.

According to a ninth aspect of the present invention, there is provided a tire sensor device, wherein the sensor devices are each provided with power regenerating means for receiving a radio wave transmitted from the car body side to generate power voltage for driving the sensors.

According to a tenth aspect of the present invention, there is provided a tire sensor device, wherein the sensor devices are each provided with a transmitter for transmitting tire information signals detected by the sensors to the base station.

According to an eleventh aspect of the present invention, there is provided a tire sensor device, wherein the base station is provided with storage means for storing the tire information signals.

According to a twelfth aspect of the present invention, there is provided a tire sensor device, wherein the base station is provided with means of processing data on tire information stored in the storage means into data based on the communication specifications of a vehicle equipped with the device so as to transmit the processed data to the car body side.

According to a thirteenth aspect of the present invention, there is provided a tire sensor device, wherein the base station is provided with power regenerating means for receiving a radio wave transmitted from the car body side to generate power voltage.

According to a fourteenth aspect of the present invention, there is provided a tire sensor device, wherein a predetermined sensor device is provided with means of storing power and means of detecting the rotation angle of the sensor of the sensor device to detect the condition of the tire at a predetermined rotation position.

According to a fifteenth aspect of the present invention, there is provided a tire sensor device, wherein a predetermined sensor device is provided with means of storing power, the base station is provided with means of detecting the rotation angle of the sensor of the sensor device, and a tire condition detection timing signal for the sensor is supplied to the sensor device from the base station to detect the condition of the tire at a predetermined rotation position.

According to a sixteenth aspect of the present invention, there is provided a tire sensor device, wherein a sensor device having no sensor is mounted so that detected tire information can be added.

According to a seventeenth aspect of the present invention, there is provided a tire sensor device, wherein the communication device or the transmitter is arranged away from the tire.

According to an eighteenth aspect of the present invention, there is provided a tire sensor device, wherein the base station is mounted to a tire rim portion or a valve device installed on the wheel, and the communication devices or transmitters of the sensors are mounted to the tire through a base-isolated device.

According to the present invention, since the sensor devices having a sensor for detecting tire information are installed at a plurality of locations of the tire and the base station for communicating with the car body side which is connected to the sensor devices is installed in the tire so that tire information detected by the sensors is collected by the base station and the collected tire information is transmitted from the base station to the car body side, suitable tire information can be obtained. Since the transmission of the tire information to the car body side is carried out only by the base station, the size and power consumption of the sensor devices can be reduced, thereby making it possible to extend the service life of the tire sensor device.

Since the above sensor devices are each provided with a communication device capable of communicating only with the base station to construct an intra-tire network, the control of the sensor devices can be carried out by the base station not only for the collection of tire information but also for the selection and measurement of required tire information. When a protocol different from a protocol used for communication between the base station and the car body side is used for communication between the base station and the communication devices, incoherence of communication can be ensured and the leakage of the tire information to the outside can be prevented.

Further, since the communication device of each sensor is provided with means of receiving a radio wave transmitted from the base station to generate power voltage for driving the sensor, a power source for the sensor device is not required and the size of the sensor section can be reduced.

Since the sensors are controlled synchronously to measure a plurality of tire information data, required tire information can be selected and measured, or desired tire information can be measured at predetermined time intervals and transmitted to the car body side.

Since a sensor device having no sensor is installed so that detected tire information can be added, a sensor or tire information can be changed or added as required.

When each sensor device is provided with power regenerating means for receiving a radio wave transmitted from the car body side to generate power voltage for driving the sensor in place of the communication device having means of receiving a radio wave transmitted from the base station to drive the sensor so as to supply power to the sensor device from the car body side and not from the base station, the size and power consumption of the tire sensor device can be further reduced. When a transmitter for transmitting tire information signals detected by the sensors to the base station is provided to collect the tire information at the base station and transmit it to the car body side, wiring is not required and the sensor devices can be easily installed at predetermined positions.

Further, when the base station is provided with means for storing the above tire condition signals, the tire information to be transmitted can be rearranged and the computation of the above tire information such as the calculation of average values can be carried out on the tire side, thereby making it possible to transmit tire information data to the car body side efficiently.

When the above base station is provided with means of processing tire information data stored in the above storage means into data based on the communication specifications on the car body side of the vehicle equipped with the device of the present invention in order to transmit the processed data to the car body side, a general-purpose tire sensor device which is flexible by the type of vehicle and a manufacturer can be provided.

Further, when a predetermined sensor device is provided with means of storing power and the sensor device or the base station is provided with means of detecting the rotation angle of the sensor of the sensor device so as to detect the condition of the tire at a predetermined rotation position, the condition of the tire can be detected more accurately.

DETAILED DESCRIPTION OF THE PREFERRED EMBODIMENTS

Preferred embodiments of the present invention will be described hereinunder with reference to the accompanying drawings.

Embodiment 1

Figure 1:
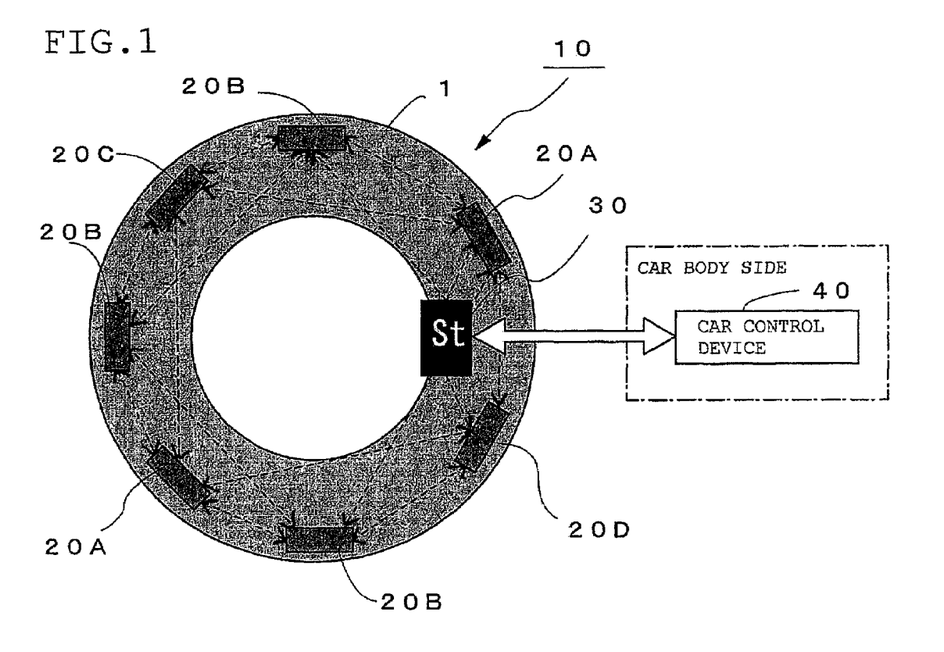
FIG. 1 is a diagram showing the outline of a tire information transmission method according to Embodiment 1 of the present invention.
Figure 2:
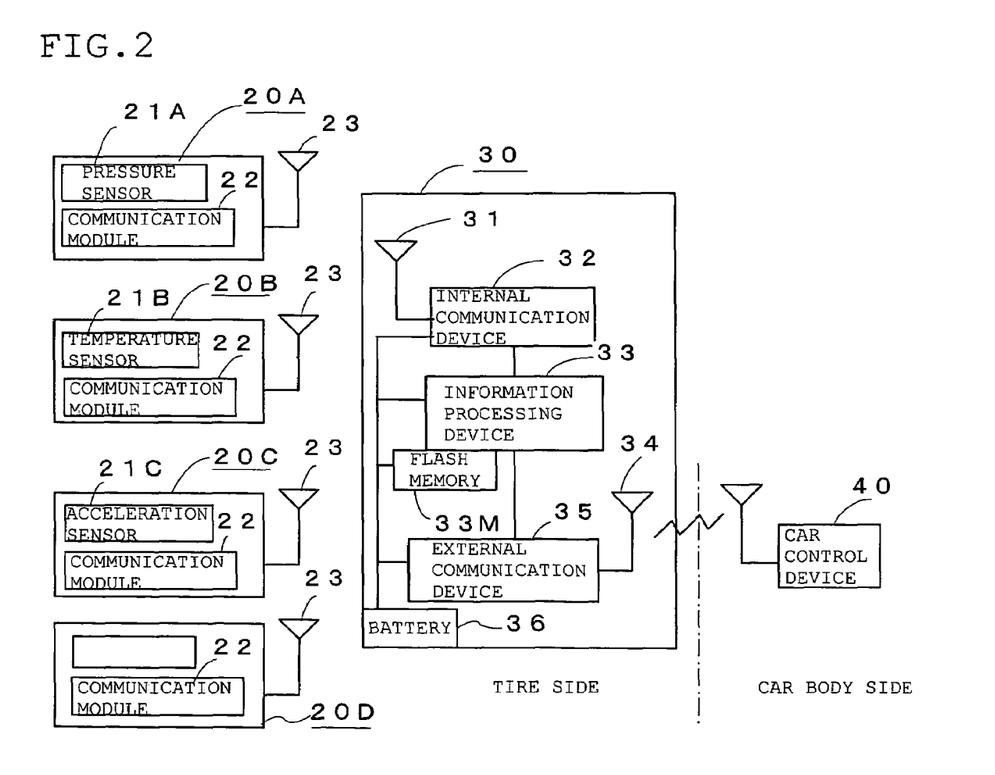
FIG. 2 is a functional block diagram of a tire sensor device according to Embodiment 1 of the present invention.
Figure 3:
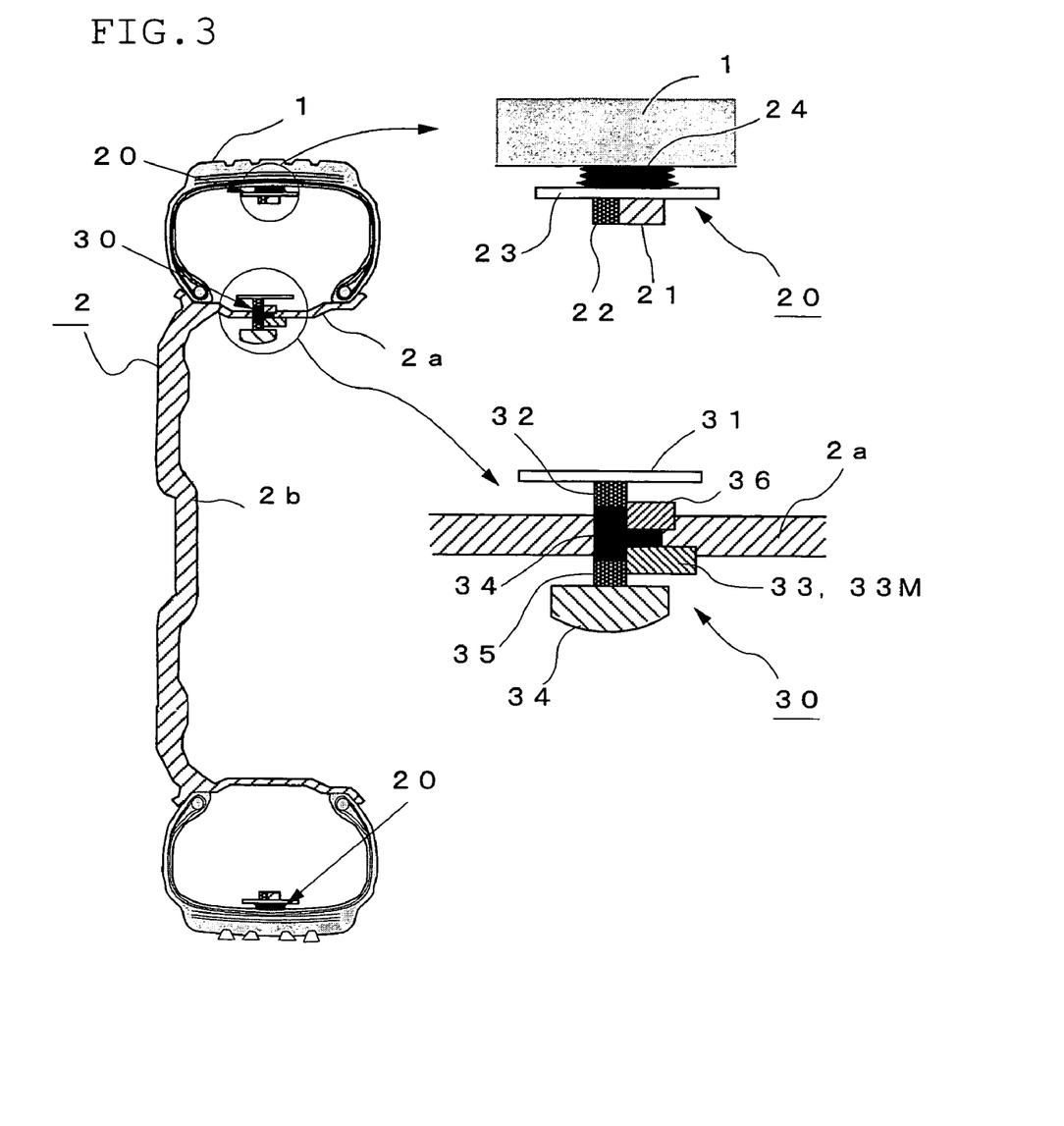
FIG. 3 is a diagram showing the installation state of the tire sensor device according to Embodiment 1 of the present invention.

FIG. 1 is a diagram showing the outline of a tire information transmission method according to Embodiment 1 of the present invention, FIG. 2 is a functional block diagram showing the constitution of a tire sensor device, and FIG. 3 is a diagram showing the installation state of the above tire sensor device. In these figures, reference numeral 1 denotes a tire, 2 a wheel consisting of a rim 2a and a wheel disk 2b, 10 a tire sensor device comprising a plurality of sensor modules 20 (20A to 20D) installed in the tire 1 and a base station 30 for constructing an intra-tire network (to be referred to as "intra-tire LAN" hereinafter) with the sensor modules 20, processing tire information signals from the sensors 21 (21A to 21C) of the above sensor modules 20 and transmitting the signals to the car body side, and 40 a car control device installed on the car body side.

Each of the sensor modules 20 comprises a sensor and communication means corresponding to an RFID chip. More specifically, the sensor module comprises a sensor 21, a communication module having a modulation/demodulation circuit for communicating with the above base station 30 and other sensor modules 20 and a power regenerating circuit for receiving a radio wave transmitted from the above base station 30 to generate power voltage for driving the above sensor 21, and an antenna 23 for transmission and reception. 21A denotes a pressure sensor for detecting the inside pressure of the tire, installed in the air chamber of the tire 1, 21B a temperature sensor for detecting the temperature of air filled in the tire 1, and 21C an acceleration sensor for detecting vibration applied to the tire 1, installed on the inner wall of a tire tread portion. The sensor module 20D is a spare module having no sensor.

Since the above communication modules 22 carry out only communication with the base station 30 and the other sensor modules 20 and not communication across the tire 1 such as communication with the car body side, they can be installed at any locations in the tire 1. When the above communication modules 22 are installed at a predetermined distance or more away from the tire 1, they are rarely influenced by the tire 1. Therefore, in this embodiment, as shown in FIG. 3, the above sensor modules 20 are mounted to the tire 1 through a base-isolated structural member 24 having a larger thickness than the above predetermined distance. The size of the above distance which depends on the structure and constituent members of the tire is about 1 cm for a frequency band of 2.45 GHz, for example.

Thereby, communication between the sensor module 20 and the above base station 30 and other sensor modules 20 is made possible and the transmission of vibration to the above sensor module 20 is reduced to ensure the durability of the device. Since only the acceleration sensor 21C detects the vibration of the tire 1 directly, it is directly installed on the inner wall of the tire 1.

The base station 30 comprises an internal communication device 32 having a first antenna 31 for communicating with the above sensor modules 20, an information processing device 33 having a flash memory 33M for temporarily storing information from the above sensor modules 20, for processing tire information signals from the above sensor modules 20, an external communication device 35 having a second antenna 34 for communicating with a car control device 40 on the car body side, and an internal battery 36. The base station 30 controls the above intra-tire LAN to receive and process tire information signals transmitted from the above sensor modules 20, transmits data on the conditions of the tire to the car control device 40 on the car body side, and transmits radio waves such as a radio signal for generating power to the above sensor modules 20, a carrier which is the basis of a radio wave used when the sensor modules 20 return a signal, and a timing signal for starting measurement. The first antenna 31, the internal communication device 32 and the internal battery 36 are installed on the tire air chamber side, the above second antenna 34 and the external communication device 35 are installed on a side opposite to the tire air chamber side, and the information processing device 33 and the flash memory 33M are installed on the rim 2a of the wheel 2.

The above base station 30 may be of a valve-integrated type that it is mounted to an unshown valve device installed on the wheel 2.

The above intra-tire LAN refers to a radio communication section capable of multiplex communication and this section is the inside of the tire 1 in which the internal communication device 32 of the above base station 30 and the communication modules 22 of the sensor modules 20 are stored. A protocol different from a protocol used for communication between the above base station 30 and the car control device 40 on the car body side is used for communication between the sensor module 20 and the base station 30 or other sensor modules 20. This makes it possible to ensure the incoherence of communication and prevent the leakage of the above tire information to the outside.

By using different protocols for communication among sensors in the tire and communication with the outside of the tire (the car body side) and adding a protocol converter for converting the protocol used for communication with the car body side, various protocols on the car body side can be handled without changing the protocol of the intra-tire LAN.

A description is subsequently given of the tire information transmission method using the above tire sensor device 10.

Air pressure, temperature and vibration tire information signals detected by the sensors 21A to 21C in the tire 1 and transmitted from the communication modules 22 of the sensor modules 20A to 20C through the antennas 23 are received by the first antenna 31 of the base station 30 and temporarily stored in the flash memory 33M of the information processing device 33 through the internal communication device 32. The information processing device 33 converts the above tire information signals into signals to be transmitted to the car control device 40, rearranges the above tire information data in a predetermined order or compresses them, and transmits them to the external communication device 35 to supply them to the car control device 40 from the second antenna 34. The car control device 40 controls the running condition of a vehicle based on the above transmitted information on the inside pressure and temperature of the tire and estimates a road friction coefficient from the above vibration data to control the running condition of the vehicle based on the estimated road friction coefficient.

At this point, the base station 30 may receive tire information signals from the sensor modules 20A to 20C continuously and temporarily store them in the flash memory 33M, or the above flash memory 33M may be omitted and protocol conversion may be carried out by the information processing device 33 to transmit tire information to the car body side.

When the above base station 30 is provided with the function of controlling the above sensors 21A to 21C synchronously to measure the tire information of the sensors, required tire information can be suitably selected and measured from among tire information from the sensor modules 20A to 20C, or desired tire information can be measured at predetermined time intervals and transmitted to the car body side, thereby making it possible to obtain tire information efficiently. Since this eliminates the need of always carrying out communication, the power consumption of the internal battery can be reduced and the service life of the tire sensor device 10 can be extended.

In this embodiment, incoherence between tire information signals from the sensor modules 20A to 20C is ensured by employing a known multiplex communication system such as frequency division or time division, a protocol used for intra-tire LAN is used as an intra-tire LAN dedicated protocol, and a general-purpose protocol is used for communication between the base station 30 and the car control device 40. Thereby, the leakage of the above tire information to the outside can be prevented and the application field of the tire sensor device 10 can be expanded.

Thus, according to Embodiment 1, the plurality of sensor modules 20, each comprising the sensor 21, the communication module 22 having a communication function and a power regenerating circuit and the antenna 23, are installed in the tire 1, the base station 30 which comprises the internal communication device 32 having the first antenna 31 for communication with the above sensor modules 20, the information processing device 33 for processing tire information signals from the above sensor modules 20, the external communication device 35 having the second antenna 34 for communication with the car control device 40 on the car body side and the internal battery 36 is mounted to the wheel 2, and the intra-tire LAN is constructed with the above sensor modules 20 and the above base station 30 so that the tire information signals from the above sensor modules 20 are processed by the base station 30 and transmitted to the car control device 40. Therefore, it is possible to separate communication among the sensors in the tire from communication with the outside of the tire (the car body side) and to prevent the leakage of tire information from the sensors to the outside. Since the above sensor modules 20 comprise the communication modules 22 having a power regenerating circuit which receives a radio wave from the above base station 30 to generate power voltage for driving the sensor 21, a power source is not required and the size of the sensor can be reduced. Therefore, a small and lightweight tire sensor device can be provided.

When the above base station 30 is provided with the function of controlling the sensors 21 synchronously, required tire information can be suitably selected and measured, or desired tire information can be measured at predetermined time intervals and transmitted to the car body side. Therefore, it is possible to obtain tire information efficiently, reduce the power consumption and extend the service life of the tire sensor device 10.

Further, in this embodiment, the sensor modules can be exchanged because the plurality of sensors are not integrated, and a new sensor can be added as required because the device comprises a sensor module 20D which is a spare module capable of communicating with the base station 30 when a sensor is installed in the sensor module 20D.

In the above Embodiment 1, the internal battery 36 is provided in the base station 30. A power generator for generating power by the revolution of the tire 1 may be installed on the wheel 2 of the tire 1 to supply power to the above base station 30. Or, like the above sensor modules 20, a power regenerating circuit for receiving a radio signal from the car control device 40 to generate power voltage may be provided in the base station 30.

In the above embodiment, the pressure sensor 21A, the temperature sensor 21B and the acceleration sensor 21C are installed as sensors for detecting the conditions of the tire. The types of the sensors are not limited to these, and a distortion sensor for detecting the distortion of the tire tread portion and a sound sensor for detecting the leakage of air in the tire may be used.

Or, completely the same sensor modules or the same type of sensor modules which differ in measurement range and accuracy may be installed at a plurality of locations of the tire 1.

In the above embodiment, the sensor module 20D which is a spare sensor module is provided so that a new sensor can be added as required. When the above base station 30 is provided with the function of processing a larger number of tire information signals than the number of the initially installed sensors and transmitting the processed signals, not only a new sensor but also a new sensor module can be added.

In the above embodiment, information on the conditions of the tire is supplied to the car control device 40. The destination of the information on the conditions of the tire is not limited to the car control device 40 and may be other device or other system installed on the car body side, such as a tire monitoring system for monitoring the conditions of the tire as in the prior art.

The tire sensor device 10 of the present invention is used not only for communication between the tire 1 and the car body side but also for communication with maintenance equipment at a service factory. Thus, the tire sensor device 10 can be used in a wide variety of fields such as tire condition monitoring systems, land transport truck control systems and high-performance tire and motor sport tire condition monitoring systems for collecting tire information.

Embodiment 2

In the above Embodiment 1, the intra-tire network is constructed with the sensor modules 20 and the base station 30, and the sensor modules 20 are each provided with a power regenerating circuit for receiving a radio wave from the base station 30 to generate power voltage for driving the sensor 21. When power is supplied to the sensor modules from the car body side and not from the base station 30, the size and power consumption of the tire sensor device can be further reduced.

Figure 4:
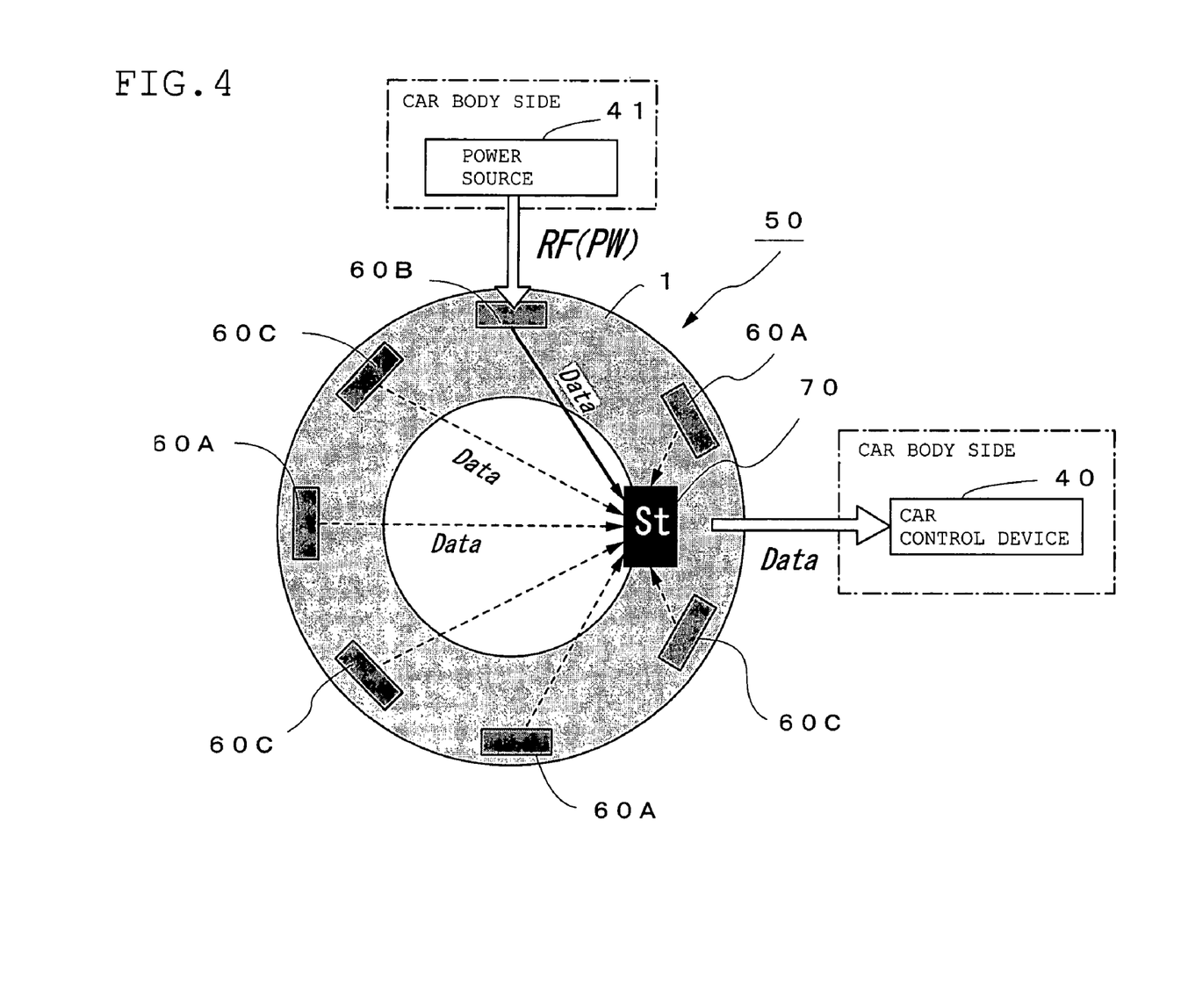
FIG. 4 is a diagram showing the outline of a tire information transmission method according to Embodiment 2 of the present invention.
Figure 5:
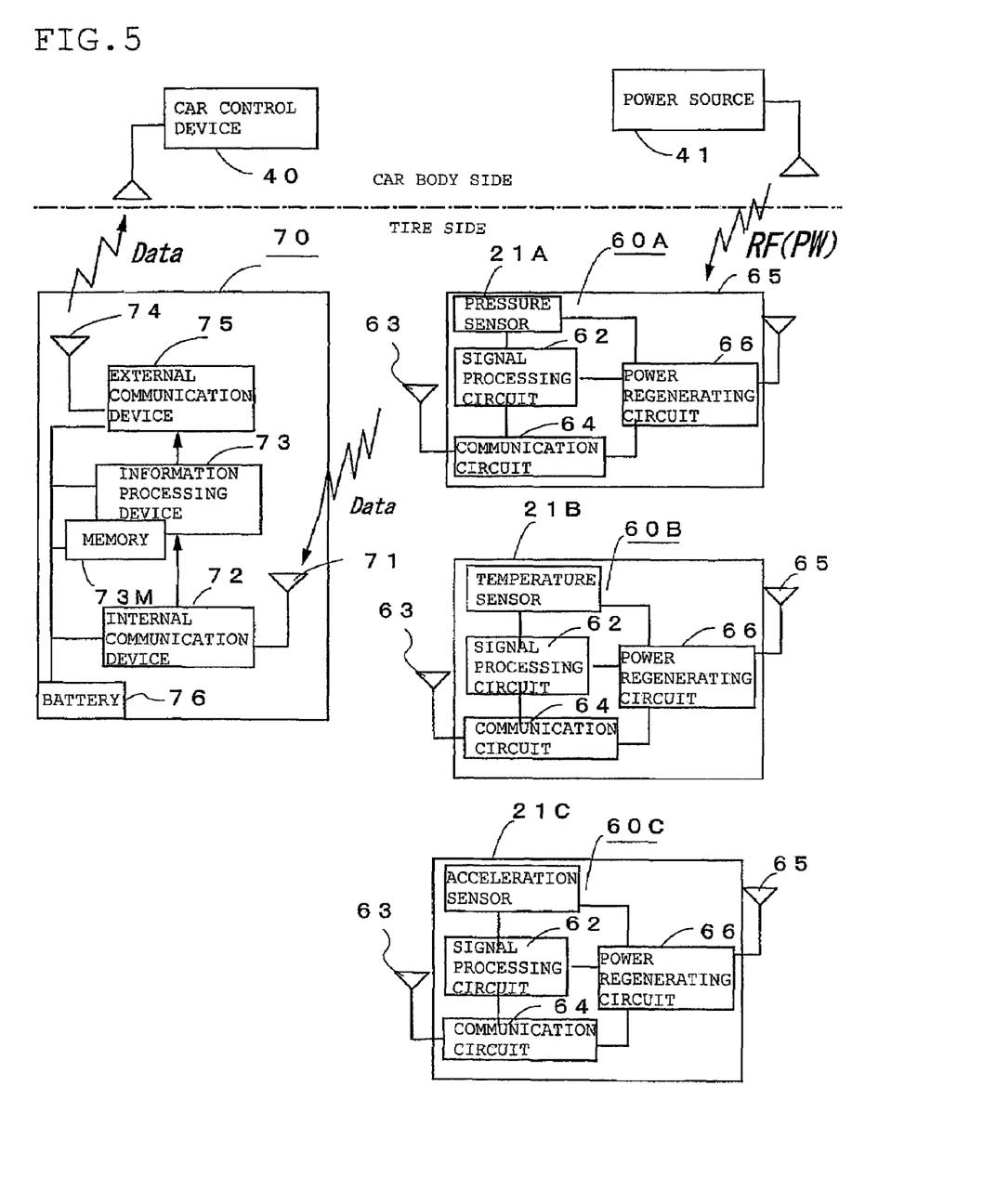
FIG. 5 is a functional block diagram of a tire sensor device according to Embodiment 2 of the present invention.
Figure 6:
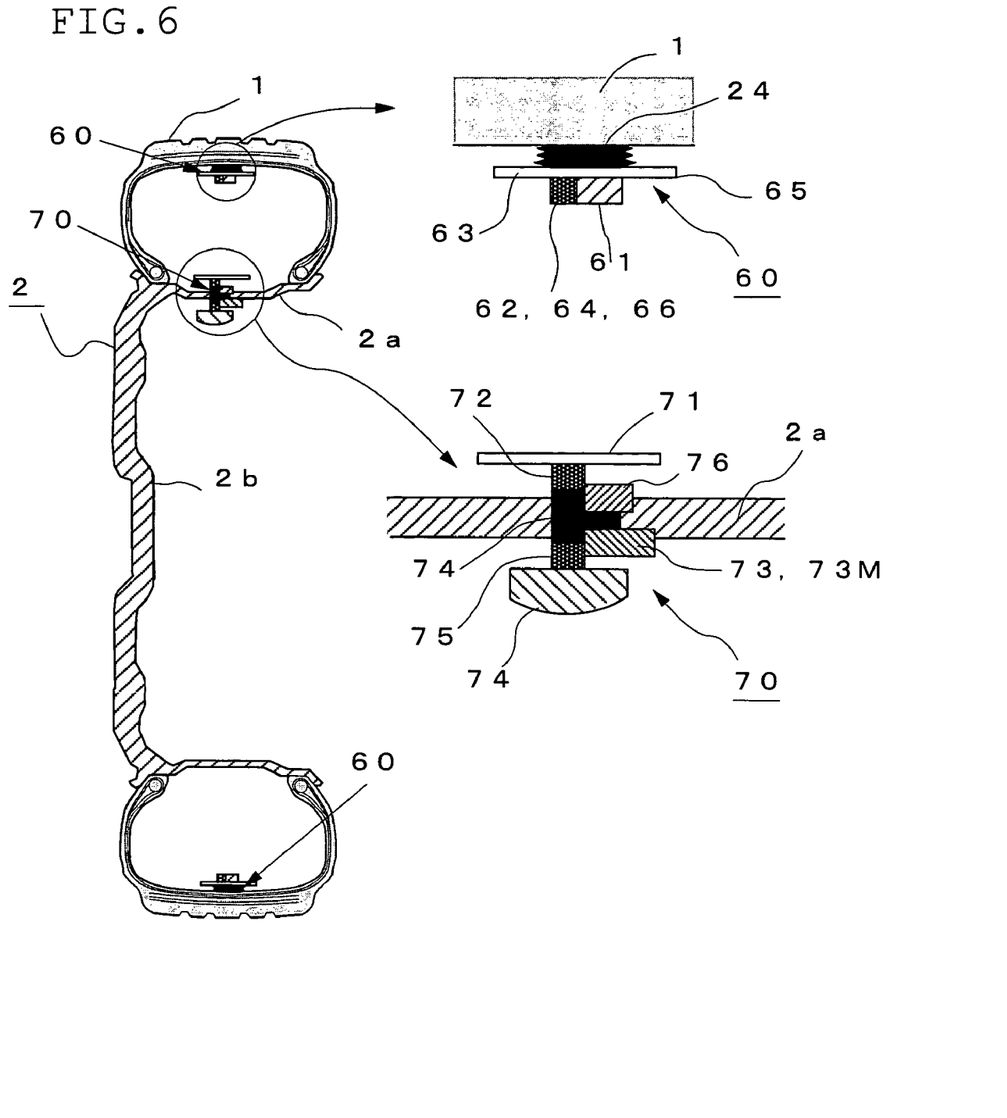
FIG. 6 is a diagram showing the installation state of the tire sensor device according to Embodiment 2 of the present invention.

FIG. 4 is a diagram showing the outline of a tire information transmission method according to Embodiment 2, FIG. 5 is a functional block diagram showing the constitution of the tire sensor device of this embodiment, and FIG. 6 is a diagram showing the installation state of the above tire sensor device. In these figures, reference numeral 1 denotes a tire, 2 a wheel consisting of a rim 2a and a wheel disk 2b, and 50 a tire sensor device comprising a plurality of sensor modules 60 (60A to 60C) installed at predetermined locations of the above tire 1 and a base station 70 for receiving and processing tire information signals from the sensors 21 (21A to 21C) of the above sensor modules 60 and transmitting the processed signals to the car body side. Numeral 40 denotes a car control device for controlling the running condition of the vehicle based on tire information transmitted from the above base station 70, and 41 a power source for supply power for driving the sensor modules 60. The car control device 40 and the power source 41 are installed on the car body side. The above power source 41 may be provided in the car control device 40.

The sensor modules 60 comprise respective sensors and communication means corresponding to an RF transponder. More specifically, the sensor modules 60 comprise respective sensors 21 (21A to 21C) for detecting tire information such as the inside pressure of the tire and the temperature of the tire, signal processing circuits 62 for converting a signal detected by the sensor 21 into a tire information signal indicative of the condition of the tire, communication circuits 63 having a transmission antenna 63, for carrying out communication with the above base station 70, and power regenerating circuits 66 having a receiving antenna 65, for receiving a radio wave transmitted from the above power source 41 to generate power voltage for driving the sensor 21. 21A is a pressure sensor for detecting the inside pressure of the tire, installed in the air chamber of the tire 1, 21B is a temperature sensor for detecting the temperature of a gas filled in the tire, and 21c is an acceleration sensor for detecting vibration applied to the tire 1, installed on the inner wall of the tire tread portion.

In this embodiment, like the above Embodiment 1, the above sensor modules 60 are mounted to the tire 1 through the base-isolated structural member 24 having a predetermined thickness so that they are separated a predetermined distance or more from the tire 1 as shown in FIG. 6 in order to reduce the influence of the rubber of the tire 1 and cords at the time of communication. Only the acceleration sensor 21C is directly installed on the inner wall of the tire 1 to directly detect the vibration of the tire.

The base station 70 comprises an internal communication device 72 having a first antenna 71 for communication with the sensor modules 60 (60A to 60C), a memory 73M for temporarily storing tire information from the above sensor modules 60, an information processing device 73 for processing tire information signals from the above sensor modules 60, an external communication device 75 having a second antenna 74 for communication with the car control device 40 on the car body side, and an internal battery 76. The base station 70 receives and processes tire information signals from the above sensor modules 60 and transmits information on the conditions of the tire to the car control device 40 on the car body side.

At this point, the first antenna 71, the internal communication device 72 and the internal battery 76 are arranged on the tire air chamber side, the second antenna 74 and the external communication device 75 are arranged on the side opposite to the tire air chamber side, and the information processing device 73 and the memory 73M are arranged on the rim 2a of the wheel 2. The above base station 70 may be of a valve integrated type that it is mounted to an unshown valve device installed on the wheel 2.

A description is subsequently given of the tire information transmission method using the above tire sensor device 50.

When the tire 1 rolls and one of the sensor modules 60 is positioned below the power source 41 installed on the car body side, an RF signal for power supply is supplied from the above power source 41 to the power regenerating circuit 66 of the sensor module 60 through the receiving antenna 65. Thereby, the sensor 21 is driven and an electric signal indicative of the condition of the tire such as air pressure, temperature or vibration is output to the signal processing circuit 62. The signal processing circuit 62 converts this electric signal into a tire information signal to be supplied to the base station 70 and transmits it to the communication circuit 64 to supply it to the base station 70 from the transmission antenna 63.

The base station 70 receives the above tire information signal through the first antenna 71 and temporarily stores it in the memory 73M of the information processing device 73. The information processing device 73 converts the transmitted air pressure, temperature and vibration signals into signals to be supplied to the car control device 40, rearranges the above signals in a predetermined order or compresses them and transmits them to the external communication device 75 to supply them to the car control device 40 from the second antenna 74.

As for data on air pressure and temperature, the above base station 70 is provided with an arithmetic unit for calculating the average values of these during a certain period of time and supplying them to the car body side so that the computation of the above tire information is carried out on the tire side and only the result of the computation is supplied to the car body side. This can greatly reduce the volume of data to be transmitted, whereby tire information data can be transmitted to the car body side efficiently.

The car control device 40 controls the running condition of the vehicle based on the transmitted information on the inside pressure and temperature of the tire, estimates a road friction coefficient from the above vibration data and controls the running condition of the vehicle based on the estimated road friction coefficient.

To collect important tire information when the tire is in contact with the ground such as information from the acceleration sensor 21C, the power regenerating circuit 66 is provided with storage means so that the accelerator sensor 21C can detect tire information (tire vibration) when the tire is in contact with the ground.

That is, power supply from the power source 41 is carried out when the sensor module 60 faces the antenna of the above power source 41. At this time, the detection of tire information is also carried out simultaneously. When the timing of supplying power differs from the timing of detecting tire information like the sensor module 60C having the above acceleration sensor 21C, the sensor module is provided with storage means for storing power and means for detecting the rotation angle of the sensor installed in the sensor module to estimate the position of the sensor from the time when the sensor faces the above antenna so that tire information is detected when the sensor turns at a predetermined angle. For instance, when the position of the antenna is right above the center of the tire, the position in contact with the ground is about 180° from the position where the acceleration sensor 21C faces the above antenna. Therefore, the detection accuracy can be improved by detecting vibration applied to the tire at that timing.

The base station 70 may be provided with means of detecting the rotation angle of the sensor so as to transmit a signal indicative of the timing of detecting the condition of the tire by the sensor to the above sensor module from the above base station.

When the base station 70 is provided with the function of controlling the sensors 21A to 21C synchronously to measure the tire information of the sensors like the above Embodiment 1, required tire information can be suitably selected and measured from the tire information from the sensor modules 60A to 60C, or desired tire information can be measured at predetermined time intervals and transmitted to the car body side. Therefore, tire information can be obtained efficiently. Further, this eliminates the need of always carrying out communication, thereby making it possible to reduce the power consumption of the internal battery 76 and extend the service life of the tire sensor device 50.

According to this Embodiment 2, the plurality of sensor modules 60 (60A to 60C), each comprising the sensor 21, the communication circuit 64 for transmitting a signal detected by this sensor 21 to the base station 70 and the power regenerating circuit 66 for generating power voltage for driving the above sensor 21 with a radio wave from the power source 41 provided on the car body side, are installed at predetermined locations of the tire 1 to detect the conditions of the tire, the detected information on the tire is collected at the base station 70 and transmitted to the car control device 40 on the car body side from the external communication device 75 of the base station 70. Therefore, a small and power-saving transmitter circuit can be used as the communication device 64 of the sensor module 60. Since the sensor module 60 can be reduced in size, it can be installed at a suitable location where tire information can be collected. Therefore, suitable tire information can be collected efficiently.

Since transmission to the car body side is carried out only by the base station 70, power consumption can be reduced and the service life of the tire sensor device 50 can be extended.

In the above Embodiment 2, the sensor modules 60A to 60C are arranged in the circumferential direction of the tire at equal intervals. The arrangement of the sensor modules 60A to 60C is not limited to this and they may be arranged in the radial direction of the tire or both the circumferential direction and the radial direction of the tire. They may be arranged at desired intervals according to the type and number of sensors and not at equal intervals.

In the above embodiment, the base station 70 is provided with the internal battery 76. A power generator for generating power by the rolling of the tire may be provided on the wheel 2 of the tire 1 to supply power to the above base station 70. The base station 70 may also be provided with a power regenerating circuit to supply power to the base station 70 from the car body side. In this case, as the base station 70 does not need to supply power to the sensor modules 70A to 70C, the size of the base station 70 can be reduced. The internal battery 76 and the power regenerating circuit may be used in combination, whereby the service life of the above internal battery 76 can be extended.

Further, when the above base station 70 is provided with means of processing tire information data stored in the memory 73M into data based on the communication specifications of the vehicle equipped with the device 50 so as to convert the above data into specification data required for the vehicle and transmit the processed data to the car body side, that is, a so-called "protocol converter function", smooth data transmission to the car body side becomes possible, thereby making it possible to obtain a general-purpose tire sensor device which is flexible by the type of vehicle and a manufacturer.

In the above embodiment, the pressure sensor 21A, the temperature sensor 21B and the acceleration sensor 21C are mounted as sensors for detecting the conditions of the tire. The sensors are not limited to these and a distortion sensor for detecting the distortion of the tire tread portion and a sound sensor for detecting the air leakage of the tire can be used.

Figure 7:
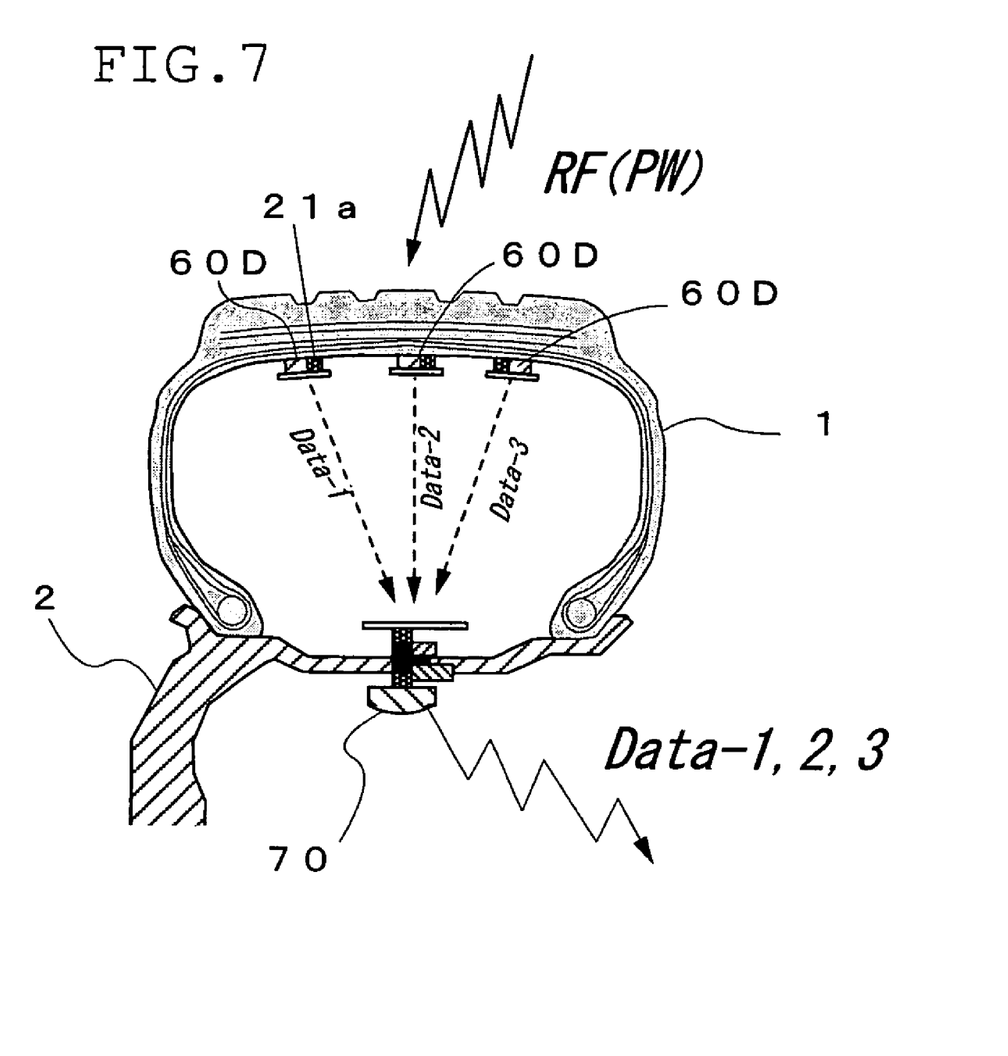
FIG. 7 is a diagram of another example of the arrangement of sensor modules of the present invention.

For example, when three sensor modules 60D comprising a distortion sensor 21a are arranged in the transverse direction of the tire on the inner wall of the tire tread to detect the distortion of the tire at respective locations as shown in FIG. 7, the distortion on the car body side of the tire by the influence of lateral force can be compared with the distortion on the outer side of the tire, thereby making it possible to obtain useful tire information and improve the running stability of the vehicle.

In the above embodiment, information on the conditions of the tire is supplied to the car control device 40. The destination of the tire condition information is not limited to this and may be other device or system installed on the car body side, such as a tire monitoring system for monitoring the conditions of the tire.

INDUSTRIAL FEASIBILITY

According to the present invention, there can be provided a practical tire sensor device which can collect required tire information efficiently because appropriate tire information can be obtained, the sensor sections can be reduced in size and power can be saved. Since power consumption can be reduced, the service life of the tire sensor device can be extended.

What is claimed is:

1. A tire sensor device comprising:
   plurality of sensor devices installed at predetermined locations of a tire; and
   a base station arranged in a tire interior and which communicates with the plurality of sensor devices; wherein
   each of the sensor devices has a sensor which detect a condition of the tire and a communication device,
   the base station comprises:
   an internal communication device having a first antenna and communicating with the plurality of sensor devices;
   an information processing device which processes a tire information signal wherein the tire information signal is information of condition of the tire detected in the sensor; and
   an external communication device having a second antenna and transmitting processed tire information to a car body side, wherein:
   the first antenna is arranged on a tire air chamber side of a wheel,
   the second antenna is arranged on an opposite side to the tire air chamber side of the wheel, and
   the communication device of the sensor devices has an antenna arranged on the tire air chamber side and is operable to communicate with only the base station and other sensor devices.

2. The tire sensor device according to claim 1, wherein the communication device of each sensor is provided with means of receiving a radio wave transmitted from the base station to generate power voltage for driving the sensor.

3. The tire sensor device according to claim 1, wherein the base station is provided with the function of controlling the sensors synchronously to measure a plurality of tire information data.

4. The tire sensor device according to claim 1, wherein the sensor devices are each provided with power regenerating means for receiving a radio wave transmitted from the car body side to generate power voltage for driving the sensors.

5. The tire sensor device according to claim 1, wherein the base station is provided with storage means for storing the tire information signals.

6. The tire sensor device according to claim 5, wherein the base station is provided with means of processing data on tire information stored in the storage means into data based on the communication specifications of a vehicle equipped with the device so as to transmit the processed data to the car body side.

7. The tire sensor device according to claim 1, wherein the base station is provided with power regenerating means for receiving a radio wave transmitted from the car body side to generate power voltage.

8. The tire sensor device according to claim 1, wherein a predetermined sensor device is provided with means of storing power and means of detecting the rotation angle of the sensor of the sensor device to detect the condition of the tire at a predetermined rotation position.

9. The tire sensor device according to claim 1, wherein a predetermined sensor device is provided with means of storing power, the base station is provided with means of detecting the rotation angle of the sensor of the sensor device, and a tire condition detection timing signal for the sensor is supplied to the sensor device from the base station to detect the condition of the tire at a predetermined rotation position.

10. The tire sensor device according to claim 1, wherein a sensor device having no sensor is mounted so that detected tire information can be added.

11. The tire sensor device according to claim 1, wherein the communication device or the transmitter is arranged away from the tire.

12. The tire sensor device according to claim 1, wherein the base station is mounted to a tire rim portion or a valve device installed on the wheel, and the communication devices or transmitters of the sensors are mounted to the tire through a base-isolated device.

* * * * *